UNITED STATES PATENT OFFICE.

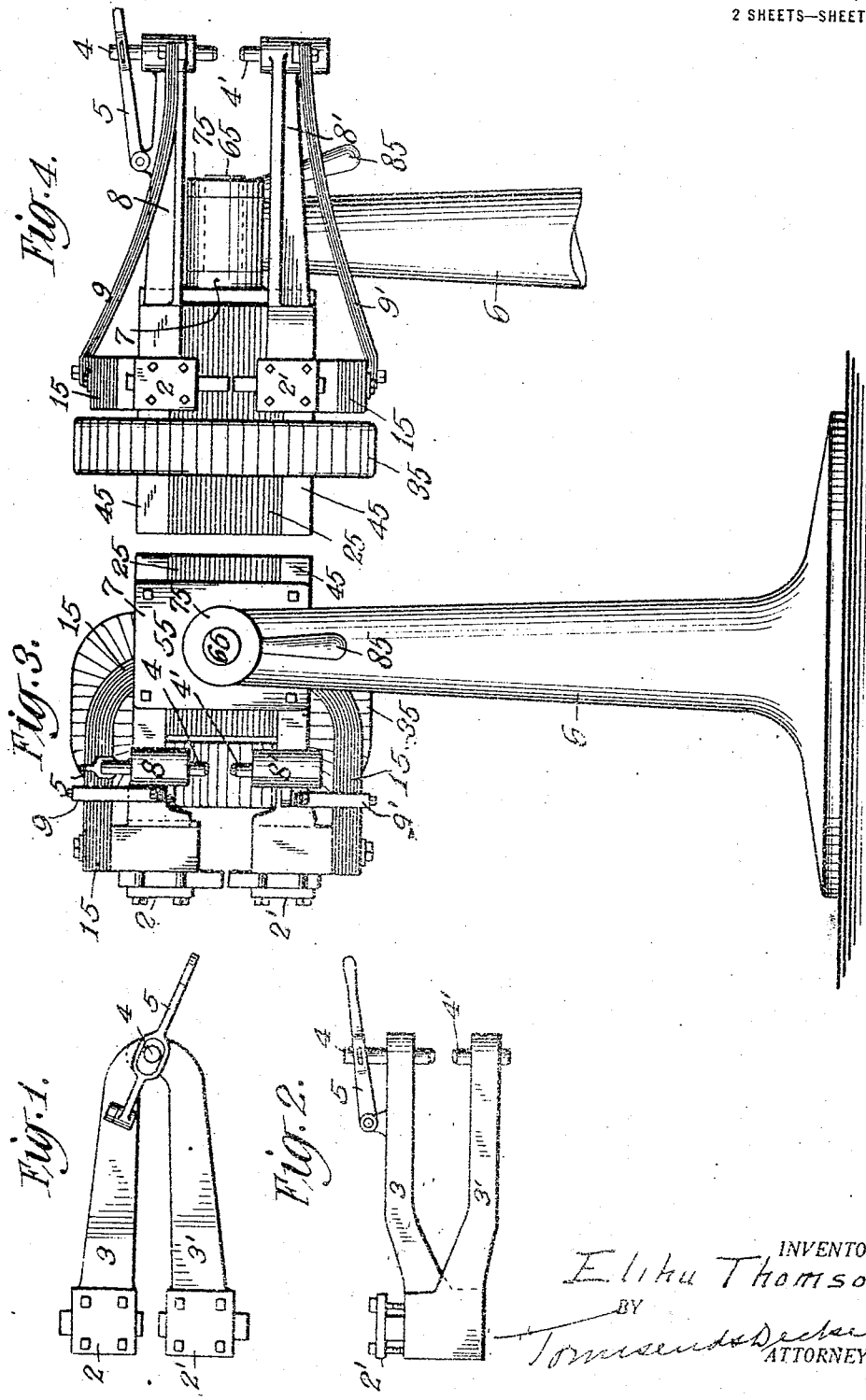
E. THOMSON.
COMBINED SPOT AND BUTT WELDER.
APPLICATION FILED AUG. 4, 1916.
1,220,997.
Patented Mar. 27, 1917.
2 SHEETS—SHEET 1.
INVENTOR.
Elihu Thomson
BY
Townsend & Decker
ATTORNEYS.

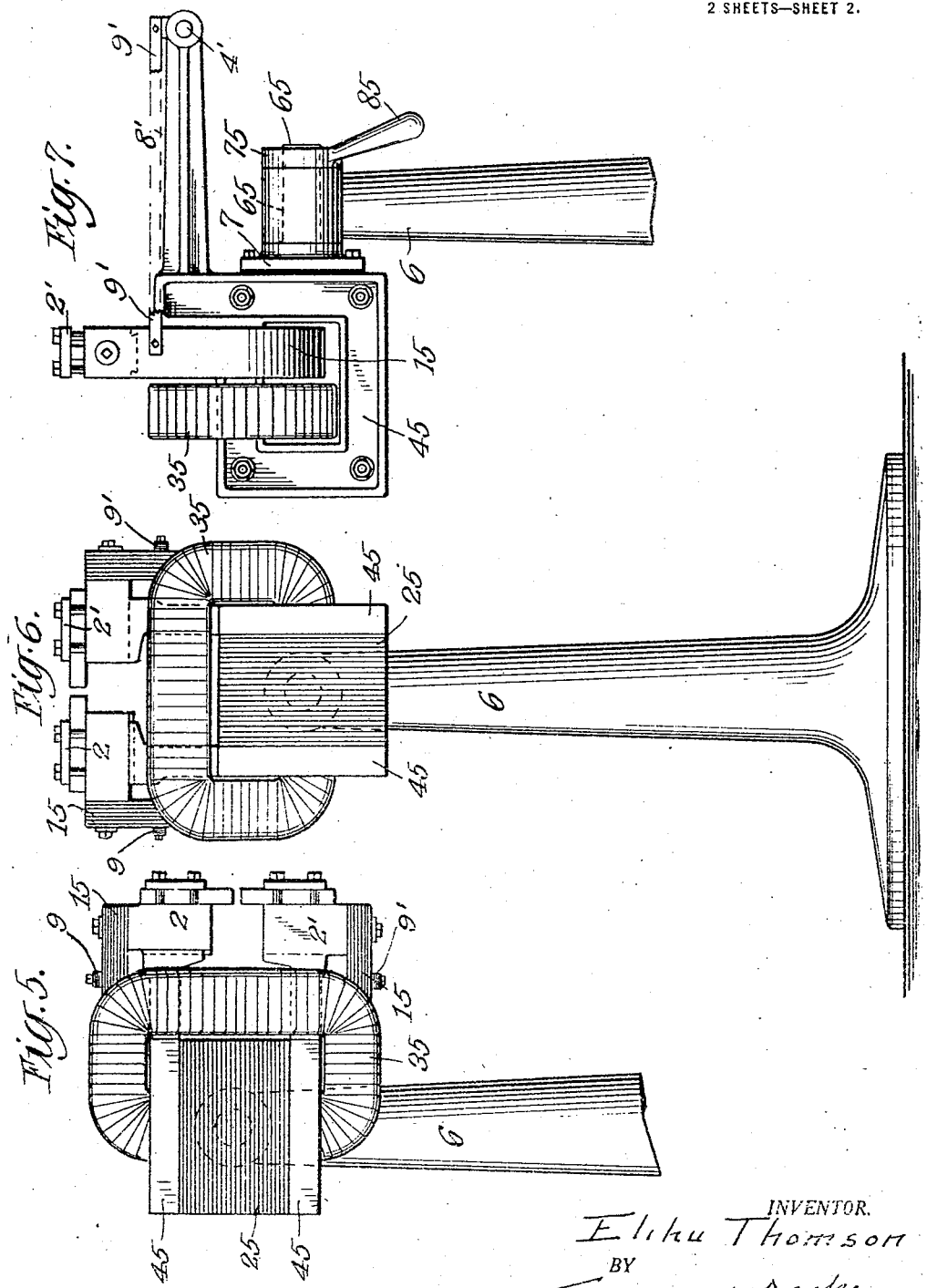

ELIHU THOMSON, OF SWAMPSCOTT, MASSACHUSETTS, ASSIGNOR, BY MESNE ASSIGNMENTS, TO THOMSON SPOT WELDER COMPANY, OF BOSTON, MASSACHUSETTS, A CORPORATION OF MASSACHUSETTS.

COMBINED SPOT AND BUTT WELDER.

1,220,997.      Specification of Letters Patent.      Patented Mar. 27, 1917.

Application filed August 4, 1916. Serial No. 113,055.

*To all whom it may concern:*

Be it known that I, ELIHU THOMSON, a citizen of the United States, and a resident of Swampscott, in the county of Essex and State of Massachusetts, have invented certain new and useful Improvements in Combined Spot and Butt Welders, of which the following is a specification.

My invention relates to the construction of electric welding apparatus and its object is to provide a machine combining in one structure electrodes for spot welding and clamps for butt welding, all fed from the same transformer secondary.

A further object of the invention is to so construct the machine that the position of the work electrodes or clamps may be changed angularly to any desired position to permit different kinds of work to be readily done, thus increasing the variety of work which can be undertaken.

To these ends my invention consists in the construction of apparatus as hereinafter described in connection with the accompanying drawings and as specified in the claims.

Figure 1 shows in skeleton or diagrammatically the basic idea of my invention by illustrating the clamps of a butt welder provided with extensions forming extensions of the secondary and provided with spot welding electrodes.

Fig. 2 is an elevation of the parts illustrated in Fig. 1.

Fig. 3 is a front view of a complete machine or apparatus in which my invention is embodied the apparatus being shown in normal position for spot welding.

Fig. 4 is a side view of the same.

Fig. 5 is a back view.

Figs. 6 and 7 illustrate in front and side elevation a position of the apparatus suitable for butt welding and obtained by shifting the apparatus around an axis formed by a pivotal point of support.

Referring to Figs. 1 and 2, the usual clamps for an electric welding machine are indicated at 2 2', the clamp bodies or work holders being supported or carried, as well understood in the art, upon and forming the terminals of the secondary of the welding transformer which furnishes the current for the butt welding operation.

3 3' indicate arms extending from the work-holders, or terminals of the secondary, and conducting current to electrodes 4 4' suitable for spot welding operations and here typified as electrodes 4 4'. One of said electrodes is furnished with the usual operating lever or operating device indicated in general by 5. Details of the welding apparatus being well known to those skilled in the art, are not further shown in these figures but, as will be well understood, the idea may be embodied in various forms some of which are illustrated in other figures. It will be understood that when the machine is used for butt welding, the spot welding devices will naturally be out of use and when it is used for spot welding, the butt welding appliances will be out of use. The disposition of the welding transformer for feeding the sets of clamps for butt welding and the electrodes for spot welding is not of controlling importance and it will also be clear that, as in previous constructions, one or both welding clamps might be movable horizontally and that when the apparatus is used for spot welding the clamps need only be fixed in position to bring the spot welding electrodes over one another.

A somewhat different arrangement is indicated in the remaining figures of the drawings and the invention is shown in these figures as embodied in a complete structure adaptable for more convenient use in carrying on different varieties of work. The usual appliances for adjusting the position of the butt welding clamps borne by the terminals of the secondary respectively with relation to one another and for moving one toward the other to effect the welding, are not shown as they are well known and may be of any desired form.

15 indicates the secondary of the transformer arranged in any proper electrical relation to the core 25 and to a primary 35, the relation shown being merely illustrative and not necessarily the construction that would be employed practically. The core 25 is as usual made of laminated iron, the laminations being clamped or bolted together between side plates 45.

For convenience I utilize said side plates in conjunction with extensions therefrom and with a suitable tie plate as the frame of the apparatus and as will be presently described. I also in the present instance show the transformer secondary as made up of copper laminations the terminals of which are clamped to the work-holder blocks carrying the work clamping devices. Supports for the work-holder blocks respectively are provided by the side plates 45 and the side plates themselves are tied together to complete the supporting frame of the transformer and welding devices by a plate 55 bolted to the flanges of the side plates 45. The frame as thus constituted is mounted on a suitable pillar or support 6 by means of a pivot 65 passing transversely through a bearing in the head of the post and adapted to be clamped in any position of rotation by a clamp nut 75 having an operating handle 85. The pivot 65 extends from the plate 55 or other suitable portion of the frame and as shown, the frame also has transverse arms or extensions 8 8' extending preferably in the opposite direction from the part carrying the transformer and butt welding portions said arms providing between them the usual work gap for spot welding operations. In the heads or ends of said arms the spot welding electrodes 4 4' are mounted and one of them is provided with a suitable operating lever 5, the spot welding electrodes in this case being mounted or guided upon the arms 8 8' which are preferably of the usual material employed for the frame portion of the electric welding machine. The spot welding electrodes are supplied with current from the transformer either wholly or in part by the flexible connections or other suitable extensions 9 9' attached or connected to the secondary terminals which supply the butt welding electrodes. In this instance as in the case of Figs. 1 and 2, it will be seen that the butt welding clamps and the spot welding devices are combined as terminals from the same secondary.

In the position of the apparatus shown in Fig. 3, which is a front view, the electrodes for spot welding are in the proper and usual position for operation in a vertical line for the spot welding operation but the butt welding portion of the machine has the clamps arranged in vertical position one over the other, which is not well suited to the usual operation of butt welding. Fig. 4 shows the same apparatus in side view with the spot welding electrodes in position for use. In the back view Fig. 5 only the butt welding clamps can be seen one above the other.

While it is not essential that the spot welding electrode be operated in a vertical line nor essential that the butt welding clamps be operated in a horizontal line, yet the apparatus by means of the pivoted support, enables these functions to be performed in the usual way by turning the frame or support into the proper position and clamping it in such position by means of the clamping devices indicated at the top of the pillar. The position of the apparatus shown in Figs. 6 and 7 brings the butt welding devices into the usual position for operation in a horizontal line, but of course brings the spot welding devices into position in which the work gap would compel the insertion of the work in a vertical direction, a position which, however, is not necessarily inconsistent with the use of the device for some classes of spot welding.

It will be seen therefore that the apparatus can be readily changed from a normal position for spot welding to a normal position for butt welding or vice versa by simply unclamping the frame at the pillar and setting it in the different positions, one at right angles to the other. If, however, special angular work is to be done, it may be set in any intermediate angular position chosen for convenient operation for either butt or spot welding.

By my invention I combine in a single structure capabilities which must increase the variety of work that can be done on the same machine.

Obviously the arms 8 8' might constitute arms or extensions directly from the movable clamp body or holder used in the butt welding action, its current carrying capacity being supplemented by that of the connections 9 9' also attached to the same secondary terminals. Provided the arm bearing the movable spot welding electrodes be sufficiently rigid, the same operating handle which operates the sliding clamp or clamp carrying slide of the butt welder could be used to move said spot welding electrode; but owing to the length and leverage of the arm 8 necessary to form a gap of the desired extent and to the weight of the parts, it would be desirable to fix the movable portions of the butt welder in position and secure the desired movement of the spot welding electrode by operating said electrode in the end of the arm 8. I do not, however, confine myself to connecting the spot welding portion of the machine to the movable portion of the butt welder in order to draw current from the same secondary terminals but might make the connection, as will be readily understood, to that portion of the secondary arm or terminal which is at all times rigid in the butt welding operation and as indicated in Figs. 1 and 2.

What I claim as my invention is:—

1. An electric welding apparatus combining in one structure electrodes for spot welding and clamps or holders for butt welding all fed by current from the same transformer secondary.

2. An electric welding apparatus having a transformer whose secondary is provided at its terminals with clamps or holders for butt welding operations and supplemental electrical terminals connected to said secondary feeding current to a pair of spot welding electrodes.

3. An electric welding apparatus having a transformer mounted upon a suitable standard or support and provided with a secondary having terminals carrying clamps or holders for butt welding and a pair of arms extended to form a gap for spot welding and carrying spot welding electrodes furnished with current by conductors extending from said secondary.

4. An electric welding apparatus having its transformer and welding devices mounted upon a suitable frame adapted to turn to change the position of the welding devices in the plane in which they operate so that the welding may be done at different angles.

5. An electric welding apparatus comprising a transformer having butt welding and spot welding devices fed therefrom and all mounted upon a frame or support capable of rotation to permit the line of operation of the welding devices to be changed to accommodate different kinds of work.

6. An electric welding apparatus having spot welding electrodes mounted upon a suitable rotatable support to permit the angle or line of operation of said electrodes to be varied with respect to the normal line of operation.

7. In an electric welding apparatus, a welding transformer having butt welding clamps or supports at its secondary terminals, a frame having arms extending therefrom in one direction to form a support for said transformer, a pivotal support for said frame and arms extending from said frame in the opposite direction to form a spot welding gap and carrying spot welding electrodes fed by extensions from said transformer secondary.

Signed at Lynn, in the county of Essex and State of Massachusetts, this first day of August, A. D. 1916.

ELIHU THOMSON.